Nov. 9, 1965   R. J. PETERS ETAL   3,216,116
SURVEYOR'S CLAMP
Filed March 16, 1964
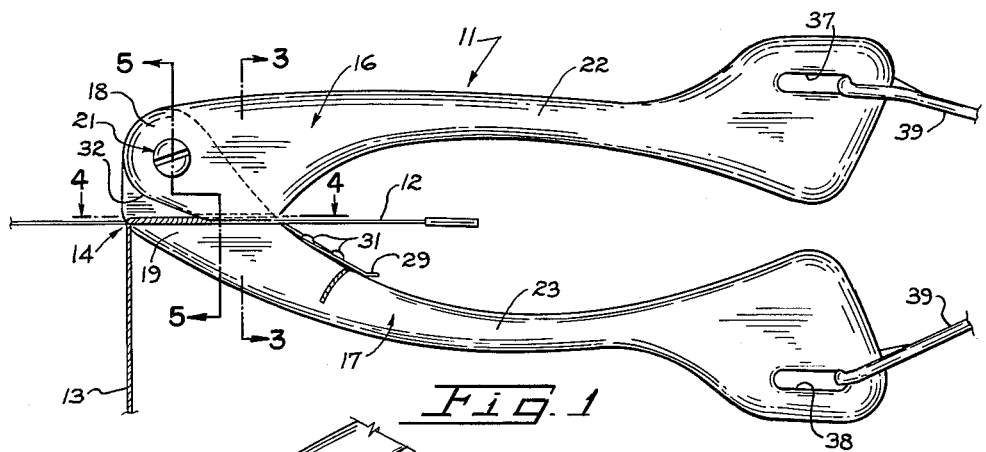
Fig. 1
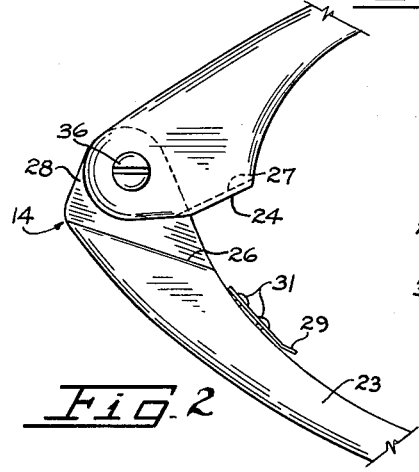
Fig. 2
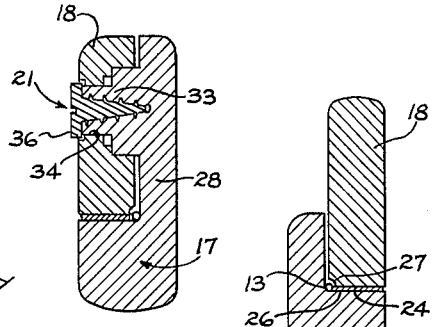
Fig. 5
Fig. 3
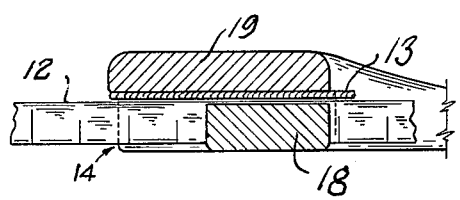
Fig. 4
INVENTORS
RAY J. PETERS &
PATRICK J. CAMPBELL
BY
ATTORNEYS

United States Patent Office 3,216,116
Patented Nov. 9, 1965

3,216,116
SURVEYOR'S CLAMP
Ray J. Peters and Patrick J. Campbell, both of 2227
Contra Costa Blvd., Pleasant Hill, Calif.
Filed Mar. 16, 1964, Ser. No. 352,278
6 Claims. (Cl. 33—137)

This invention relates to surveying tools in general, and is particularly directed to a device for the hand clamping of the ends of a surveyor's chain or tape and for the securance of a plumb line to provide accurate surveying measurements.

In surveying, anything that a surveyor can do to improve the accuracy of his lineal distance measurements will greatly improve his surveying results. In order to obtain good lineal distance measurement, it is necessary for a chainman or tapeman to firmly grip the end of a chain or tape and pull it taut to insure its full horizontal extension. At the same time when either end of the chain or tape is elevated it may be necessary to provide a plumb reference therefor. This may be satisfactorily accomplished by the hand holding of the elevated tape end and separate holding of a plumb line against the tape with the thumb in circumstances where the tapeman is stationary and the tape is being held at chest level. It will be appreciated, however, that such approach to the problem is not particularly acceptable in situations where the tapeman has to move about or chain over his head.

Accordingly, it is an object of the present invention to provide a hand-held clamp which is capable of gripping a surveyor's tape or the like to facilitate pulling of the tape end, while at the same time being capable of adjustably holding a plumb line adjacent to a portion of the gripped tape end. As a result, the intersection of the plane of the gripped tape end with the vertical axis of the plumb line may be employed to provide an accurate vertical reference with a point located on the ground.

Another object of the invention is to provide a device as above described which may be used in the above manner and with the same degree of accuracy when the tape is horizontal and thus define a perpendicular relationship with the plumb line, or when the tape is inclined as in measuring a slope distance and thus defines an acute or obtuse angle with the plumb line.

Another object of the invention is the provision of a clamping device of the class described which is so arranged that the tape and plumb line may be adjusted independently of each other. The tape may be unclamped and adjusted to provide a different linear reference mark while the plumb line is fixed to maintain the original vertical reference. Conversely, gripping of the tape may be sustained and the plumb line adjusted in providing a different vertical reference without changing or losing the original linear reference mark.

Still another object of the invention is to provide a clamping device of the class described which is arranged to uniformly distribute the clamping forces exerted on the tape over a sufficiently large area that the tape may be tightly gripped and yet not be dented, snagged, or otherwise damaged.

It is yet another object of the invention to provide a clamping device of the class described which is designed to provide a reference for the tape in a region of the device spaced from the clamping area and wherein the measurement indicia on the tape in the vicinity of the reference is fully exposed to the view of the tapeman.

A further object of the invention is the provision of a clamping device of the class described which is adapted to be secured in the clamped position to free one of the tapeman's hands for other tasks.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a side elevational view of a surveyor's clamp in accordance with the present invention and illustrating the relationship of a tape and plumb line in operative association with the clamp.

FIGURE 2 is a fragmentary side elevational view of the clamp with the clamping faces thereof in open position.

FIGURE 3 is an enlarged sectional view taken at line 3—3 of FIGURE 1, illustrating particularly the relationship of the tape clamping faces of the clamp and a rabbet in one of the faces for slidably receiving a plumb line.

FIGURE 4 is a sectional view taken at line 4—4 of FIGURE 1, illustrating particularly further details of the clamping faces and rabbet.

FIGURE 5 is a sectional view taken at line 5—5 of FIGURE 1, illustrating particularly details of the pivot bearing of the clamp.

Referring now to the drawing, FIGURE 1 in particular, there will be seen to be provided a clamping device 11 which is arranged to facilitate hand held gripping of a surveyor's chain or tape 12 and securance of a plumb line 13 in a fixed reference position to the tape. Of particular importance, the device 11 is so arranged that the tape 12 may be released and adjusted while the plumb line 13 is maintained in secured position. Conversely, the plumb line 13 may be released and adjusted while the tape 12 is gripped in fixed position. Moreover, the device provides a reference position, as indicated at 14, of intersection of the vertical axis of the plumb line with the horizontal plane of the tape which is clearly visible to the user. In addition, the device is designed such that the tape is exposed to view in the vicinity of the reference 14, and the measurement indicia on the tape may consequently be readily aligned with the reference.

In the accomplishment of the foregoing general purposes, the device 11 includes upper and lower clamping members 16, 17 respectively formed with head portions 18, 19 mounted for pivotal rotation relative to each other, as indicated at 21, and with slightly curved elongated handle portions 22, 23 extending from the head portions. The head portion 18 of the upper clamping member is provided with a substantially smooth flat jaw 24 while the head portion 19 of the lower member is provided with a substantially smooth flat table 26. The jaw and table are positioned to be disposed in parallel slightly spaced apart confronting relationship when the head portions are pivoted towards each other as by hand grasping the handle portions of the clamping members and squeezing of same together. The jaw 24 and table 26 define opposed confronting gripping faces between which the tape 12 may be firmly gripped when the handle portions are forced towards each other. In this regard it is of importance to note that the jaw 24 and table 26 engage the tape over a relatively large surface area. As noted previously, the surfaces of the jaw and table are substantially smooth. Of more importance, the amount of spacing between the jaw and table when they are in parallel confronting relation is arranged to be substantially equal to the thickness of the tape 12. It will be thus appreciated that all of the foregoing factors contribute to the bearing forces exerted on the tape by the jaw and table, being uniformly distributed over a relatively large area of the tape. The bearing forces are thus not concentrated in any one portion of the tape, and accordingly the tapes are not dented by the clamping forces. Yet, the jaw and table may be positioned near the pivot point 21 to provide a high mechanical advantage and insure tight gripping of the tape in response to an operator's squeezing the upper and lower handle portions of the clamping members.

Considering now the independent securance and adjustment of the plumb line 13 in the clamping device to provide a vertical reference to the tape in alignment with a point on the ground, it is to be noted that the jaw 24 is formed with a groove or rabbet 27 extending along the inner edge thereof. This inner edge of the jaw is disposed adjacent a lug or ear 28 of the lower clamping member head portion 19 which extends upwardly from the table 26 and forms a part of the pivot 21 in a manner subsequently described. The rabbet has a cross sectional size sufficient for passage of the plumb line 13 without binding or catching when the jaw and table tightly grip the tape therebetween. Consequently, the plumb line may be extended in substantially right angular relation over a lip or straight edge at the leading end of the table 26, which defines the reference position 14 of previous mention, and across the table freely through the rabbet. Securance of the plumb line is then facilitated by means of a spring clip 29 secured by rivets 31, or the like, to the upper edge of handle portion 23 at a position preferably immediately adjacent the trailing edge of the table. The heads of the rivets 31 are best slightly upwardly spaced from the clip, rather than being flush therewith, in order to insure ready insertion of the plumb line thereunder. With the line inserted under the clip, the resilient force of the clip serves to secure the line in place. The leading end of the line extends over the reference edge 14 of the table and vertically downward therefrom such that when the line is aligned with a point on the ground, the edge 14 serves as an accurate reference to the tape which is extended horizontally across this edge. During the changing of a vertical reference, the plumb line is simply withdrawn from beneath the clip 29 and taken up or played out as desired, and thereafter, with a new vertical reference located, the line is again fixed in position by slipping the line under the free end of the clip.

To facilitate the ready viewing of the reference edge 14 and the tape in the vicinity thereof, it is of importance to note that provision is made to expose a forward portion of the table extending rearwardly from edge 14 when the jaw and table are in their tape clamping positions. More particularly, the leading edge of the jaw 24 terminates in an upwardly inclined portion 32 of the head 18 which extends to the leading end thereof. The leading edge of the jaw is thus rearwardly spaced from the reference edge 14 of the table when the jaw and table are in clamping positions. A viewing gap is defined between the inclined portion 32 and the table in a region thereof which extends forwardly from the leading edge of the jaw to the reference edge. As a result, measuring indicia of a tape clamped between the jaw and table are fully visible to the tapeman in the vicinity of the edge 14, as is best shown in FIGURE 4.

In the preferred structure of the pivot 21, there is provided a stepped boss 33 which projects transversely from the ear 28 of lower member 17. The boss is received in a stepped bearing aperture 34 formed in the head 18 of upper member 16, the enlarged portion of the boss rotatably bearing against the wall of the enlarged portion of the aperture and the reduced portion of the boss extending through the reduced portion of the aperture in rotatable relation thereto. A cap screw 36 secured to the reduced portion of the boss and having its head bearing against the exterior face of the upper member head portion 18 serves to maintain the clamping members in pivoted rotatable relationship.

In the use of the clamping device, a tapeman first opens the jaw and table, as indicated in FIGURE 2, by pivoting the handle portions 22, 23 away from each other. The plumb line 13 is inserted along the inner edge of the table, i.e., the edge of the table from which the ear 28 projects, a plumb bob (not shown) being employed to maintain tension on the line. Also, as above mentioned, the reference edge 14 may be accurately positioned directly over a point on the ground by adjusting the length of the plumb line 13 to the desired height of the device above the ground. With a proper vertical reference obtained, the line is inserted under the spring clip 29 and is thereby secured in place. The surveyor's chain or tape 12 is then placed on the flat table 26 with the reference edge 14 thereof extending under the tape at right angles to the tape edges and directly beneath the desired measurement indicia on the tape. With the plumb line and tape properly positioned, the tapeman squeezes the handle portions of the clamping members together to thereby move the jaw and table together into engagement with the tape. Upon continued squeezing of the handles, the tape is gripped between the jaw and table with a substantially greater force than the squeezing force of the tapeman's hands by virtue of the mechanical advantage accruing from the length of the handle portions. As noted previously, the viewing gap between the inclined portion 32 and the table exposes the measuring indicia on the tape in the vicinity of the edge 14. The indicia is thus fully visibly to the tapeman and readings can be readily made at the reference edge 14 which denotes the intersection of the horizontal plane of the tape with the vertical axis of the plumb line.

When it is desired to change the length of the plumb line in the location of a different vertical reference, the tapeman need merely remove the end of the line from under spring clip 29. The line is then taken up or played out to locate the desired reference, the line sliding freely through the passage formed by the rabbet 27, table 26, and ear 28. When the reference is found, the line is again slipped under the clip 29 to thus secure the position of the line. It will be thus appreciated that there is no need to unclamp the tape when the length of the plunb line is changed. As a result, the reference of the tape is not lost and does not have to be relocated each time the vertical reference is changed. Conversely, the tapeman can release the tape at any time without losing or changing the vertical reference.

Although for the most part the clamping device 11 will be grasped with one or both hands of the tapeman in the holding of the tape, in various applications it will be desirable that both hands of the tapeman be freed to perform other tasks. To the foregoing end, slots 37, 38 are preferably provided in the free ends of the handle portions 22, 23 for receiving a thong 39, or the like, which may be threaded therethrough. The free ends of the handle portions may be lashed together by means of the thong with sufficient force to clamp the tape between the jaw and table. The thong may then be tied to a range pole or the like to thus secure the clamping device thereto and eliminate the need for the hand holding thereof by the tapeman.

What is claimed is:

1. A clamping device for use in surveying comprising a pair of clamping members having opposed gripping faces at one end, means mounting said clamping members for pivotal movement relative to each other, said gripping faces being disposed in confronting relation to grip a surveyor's tape therebetween in response to pivotal movement of the clamping members towards each other, one of said gripping faces having a groove along a side edge thereof for the free passage of a plumb line therethrough, the gripping face of one of said clamping members having a straight leading edge to define the intersection of the plane of a gripped tape with the vertical axis of a plumb line passing through said groove to thereby provide a reference position between said tape and said plumb line, and line securing means carried by one of said gripping members for the securance of said plumb line thereto.

2. A clamping device for use in surveying comprising a pair of clamping members having opposed gripping faces at one end, means mounting said clamping members for pivotal movement relative to each other, said gripping faces being disposed in confronting relation to grip a surveyor's tape therebetween in response to pivotal movement of the clamping members towards each other, one of said gripping faces having a groove along a side edge thereof for the free passage of a plumb line therethrough, and line securing means carried by the other of said gripping members for the securance of said plumb line thereto, the gripping face of one of said clamping members having a straight leading edge and the leading edge of the gripping face of the second clamping member being rearwardly spaced from the leading edge of the first when the gripping faces are in confronting relation, said second clamping member having an upwardly inclined edge portion extending forwardly from the leading edge of the gripping face thereof, said upwardly inclined edge portion being spaced from the gripping face of the first clamping member when the gripping faces are disposed in confronting relation to thereby expose tape gripped between said gripping faces in the vicinity of the leading edge of the gripping face of the first clamping member.

3. A surveyor's clamp comprising first and second clamping members having head portions with elongated handle portions extending therefrom, said head portion of said first clamping member having a flat jaw formed therein with a rabbet along a side edge thereof, said head portion of said second clamping member having a flat table formed therein and extending thereacross, said table having a straight leading edge, means pivotally connecting the head portions of said clamping members for movement of said jaw and table thereof into parallel confronting relation in response to movement of the handle portions of the clamping members towards each other whereby a tape inserted between the jaw and table is gripped while said rabbet defines a passage for slidably receiving a plumb line extending around the leading edge of said table and across the table, and spring clip means carried by the handle portion of said second clamping member adjacent said table for releasably securing a plumb line thereto, said head portion of said first clamping member having an upwardly inclined edge extending forwardly from said jaw to expose tape positioned on said table and gripped between said jaw and table in a region between the leading edge of the jaw and leading edge of the table.

4. A surveyor's clamp comprising a first clamping member having a head portion with an elongated handle portion extending therefrom, said head portion having a smooth flat table formed therein and extending thereacross and an ear projecting upwardly from a side edge of the table, said table having a straight leading edge, a second clamping member having a head portion with an elongated handle portion extending therefrom, said head portion of the second clamping member having a smooth flat jaw formed therein with an upwardly inclined portion extending forwardly from the leading edge of the jaw, means pivotally connecting the head portion of said second clamping member to said ear of the head portion of said first clamping member for movement of the jaw and table thereof into parallel confronting relation with said upwardly inclined portion overlying the leading portion of said table, said jaw having a rabbet along the side edge thereof adjacent said ear, and spring clip means secured to the handle portion of said first clamping member adjacent said table.

5. A clamp according to claim 4, further defined by the pivot means comprising a stepped boss projecting from said ear, said head portion of said second clamping member having a stepped aperture receiving said boss with the enlarged portion of the boss rotatably engaging the enlarged portion of the aperture and the reduced portion of the boss extending through the reduced portion of the aperture in rotatable relation thereto, and a cap screw secured to the reduced portion of said boss and having its head bearing against the exterior face of the head portion of said first clamping member.

6. A device for the hand clamping of a surveyor's tape comprising a first clamping member having a head portion with a handle portion extending therefrom, said head portion having a flat smooth table formed therein and extending thereacross, said table having a straight leading edge, a second clamping member having a head portion with a handle portion extending therefrom, said head portion of said second clamping member having a flat smooth jaw formed therein with an upwardly inclined edge extending forwardly from the jaw, and means pivotally connecting the head portions of said clamping members for movement of said jaw and table into parallel confronting relation in response to movement of the handle portions of the clamping members towards each other, said jaw and table having a gap therebetween when disposed in parallel relation substantially equal to the thickness of a surveyor's tape, said inclined edge overlying a leading portion of said table when said jaw and table are disposed in parallel relation.

References Cited by the Examiner

UNITED STATES PATENTS

| | | | |
|---|---|---|---|
| 233,619 | 10/80 | Horseley | 24—132.1 |
| 467,815 | 1/92 | Kent | 24—132 |
| 531,813 | 1/95 | Van Vlack | 24—132 |
| 852,676 | 5/07 | Parsons | 33—216 |
| 862,839 | 8/07 | Nelson | 33—137 |
| 1,653,747 | 12/27 | Usher | 24—132 |
| 2,330,736 | 9/43 | Paulson | 24—132 |
| 3,039,195 | 6/62 | Letty | 33—85 |

ROBERT B. HULL, *Primary Examiner.*

ISAAC LISANN, *Examiner.*